R. S. BRYANT.
VEHICLE WHEEL RIM.
APPLICATION FILED MAR. 11, 1914.

1,430,213. Patented Sept. 26, 1922.

WITNESSES
O. M. Kappler
H. B. Fay

INVENTOR
Richard S. Bryant
BY Fay & Oberlin
ATTORNEYS

Patented Sept. 26, 1922.

1,430,213

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE WHEEL RIM.

Application filed March 11, 1914. Serial No. 823,981.

*To all whom it may concern:*

Be it known that I, RICHARD S. BRYANT, a citizen of the United States, and a resident of Cleveland, county of Cuyahoga and State of Ohio, have invented a new and useful Improvement in Vehicle Wheel Rims, of which the following is a specification, the principle of the invention being herein explained, and the best mode in which I have contemplated applying that principle, so as to distinguish it from other inventions.

The present improvements relate more particularly to that type of demountable tire-supporting rim wherein provision is made for the placing on of the tire and its removal from the rim by transversely splitting the latter so as to permit of its contraction to less than normal diameter. This construction permits of the use of integral flanges for retaining the tire on the rim in place of the detachable flanges, one or more of which are otherwise necessary for use with modern double-tube pneumatic tires, the outer tube or "shoe" of which has relatively inextensible edges. The object of the present invention is to provide a "split" rim of the type just referred to having improved locking means for securing such ends against relative displacement. The present improved locking means possess an additional advantage of considerable practical importance by reason of the simplicity of their initial attachment to the rim, the usual somewhat complicated method of assembly being rendered susceptible of material and labor saving modifications in the present instance. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Figure 1:
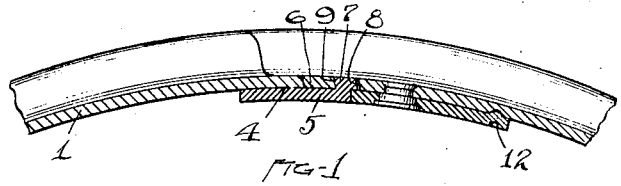
Figure 2:
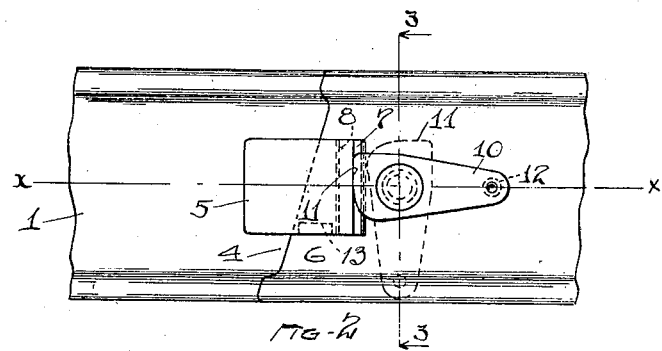
Figure 4:
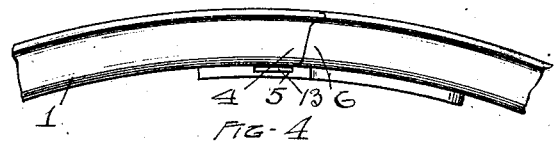
Figure 3:
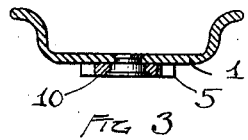
Figure 5:
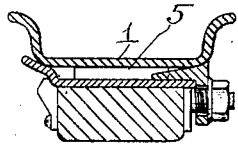

Figure 1 is a central longitudinal section of a portion of a rim embodying my present improvements; Figure 2 is a bottom plan view of such rim portion; Figure 3 is a transverse section on the line 3—3, Figure 2; Figure 4 is a side elevation of such portion of a rim; and Figure 5 is a transverse section similar to Figure 3, but showing one approved mode of securing such demountable rim onto the wheel felly.

My improved rim, as usual in rims of the type in question, consists of a discontinuous band or annulus 1 held in juxtaposition by the resilience of the band. Such band may obviously have either the cross-section illustrated in Figure 3 for the reception of straight-sided tires or any other desired construction as regards the flanges for the reception of tires of different types, such for example as clincher tires. The rim is preferably split diagonally, the line of such split being inclined to the median line $x$—$x$ of the rim as best shown in Figure 2. In order to facilitate the springing of the ends of the rim into their complimentary positions, the rim is cut along a plane formed at an angle to the radius of the rim through such point of cutting, as indicated in Figures 1 and 4.

Suitably attached to the under side of the one end 4 of such rim, I provide a tongue in the form of a plate 5, which projects beyond such rim so as to extend beneath the other end 6 thereof, when such ends are brought into juxtaposition. Such plate or tongue 5 is provided upon such extending end with a transversely disposed rib or lug 7 that is adapted to enter a transverse recess, preferably in the form of a slot 8, formed in the other end portion 6 of the rim at a point adjacent to, but spaced from, the rim-end. Such slot 8 is provided with a transversely disposed engaging face 9, which is preferably inclined to the radius of the rim passing through the same, so as to form an acute-angled edge on the side of the slot nearest the rim-end. The rib 7 on the plate 5 is provided with a complementary engaging face, the plane of such face also lying at an angle to the radius of the rim therethrough and being parallel to such engaging face 9 of the slot.

It will also be observed that the rib 7 on the plate 5 extends slightly beyond the body of the plate, thus forming a right-angled recess or corner at the outer end of such plate. This extension co-operates with a locking device which will now be described. Such locking device comprises a member 10 pivotally mounted upon the lower side of the rim-end 6, such member having a straight face 11 of which one corner is rounded off as shown in Figure 2 so as to be capable of a cam action. When the ends of the rim are to be brought into juxtaposition, or are to be separated, this locking member or latch is in the position shown in dotted outline in said Figure 2, and assuming said rim-ends to be in juxtaposition with the rib 7 on the plate 5 in interlocking engagement with the slot 8, the parts are locked in such position by swinging member 10 in a counter clock-wise position, whereupon the end face of said member gradually engages the end of the plate 5 so as to force together the complementary edges of the rib and slot. The locking member 10 at the same time is moved under the extending portion of the rib 7, thus preventing such rib from becoming disengaged from the slot until the locking member has been returned to its inoperative position.

Said locking member is adapted to be retained in its operative position by means of a small projection or lug 12 on its outer end which is resiliently held in a notch or depression in the rim in such operative position of the member.

It will of course be understood that a rim of this type is operated to permit of the removal of the tire therefrom by contraction of the rim, one end, in this case the end 4, being forced inwardly and then moved longitudinally beneath the other end 6 of the rim a sufficient distance to so reduce the circumference of the rim as to permit of the ready removal of the tire therefrom. Assuming the locking device to be in inoperative position, the end 4 of the rim may be conveniently forced inwardly by means of a screw driver or similar tool, which may be inserted in a transversely disposed slot or recess 13 formed in the plate 5, or by otherwise inserting such a tool between such plate and the end portion 6 of the rim. In this way the rib 7 is forced out of interlocking engagement with the slot and the separation of the rim-ends thus rendered possible.

Conversely, the rim is applied to a tire by placing the same, while in such contracted condition, within the tire and then allowing the rim to spring or expand outwardly. In this operation, the end 4 of the rim, which is brought beneath the other end 6, is forced longitudinally away from the same until the complementary rim-ends are brought into juxtaposition. Thereupon the resilience of the rim causes the rib 7 on the plate 5 to automatically engage the slot 8, whereby the rim-ends are securely held against relative movement in either a transverse or longitudinal direction. The locking member 10 is then swung into operative position and escape of the plate from its interlocking engagement with the slot thus entirely prevented, as has been already described.

In the present type of rim the ends are securely held in their proper relation, in this way preventing any wear on the tire by reason of the relative movement which has been found to often take place between the ends of the rim. This type of demountable rim may of course be used with any suitable retaining means upon the felly band, a well known type of such means being illustrated in Figure 5. It will be noted that the plate 5 rests upon the felly band and serves to support the rim at this point.

The securing means which I have described provide an effective and simple mechanism for maintaining the rim ends in juxtaposition and serve the additional purpose of simplifying the manufacture of the rim. In making such a rim, a smooth flat annulus is first rolled to shape to form the flanges, and is next cut transversely, whether on a diagonal plane or not is unimportant. Such transverse cut may be also either inclined to the radial plane through such point of cutting or on such plane as desired. The next step in the present construction will be the punching of the hole to receive the rivet which attaches the latch 10 and the punching of the slot 8. The latch 10 may next be applied and riveted. The final operation must of course be the attachment of the plate 5 and this operation is rendered simple since the plate 5 can be placed in position to be engaged by the latch 10, and the latter turned into locking position, thus holding the plate against movement in any direction. The ends of the rim may then be placed in juxtaposition and placed in a clamp of a welding machine. It is thus impossible to weld the plate 5 to the rim end 4 in any but correct position and this may be done without the use of any special tools or jigs.

This simple and inexpensive method of assembly is made possible by the interlocking character of the latch of the plate when engaged, the plate being held in position against movement in any direction. By the use of my improved securing means the cost of manufacture of transversely split rims has been materially reduced without, in any way, lessening the security of the locking means, the present means being obviously secure and positive in construction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a transversely split tire-supporting rim, having a transversely disposed slot adjacent to, but spaced from, one end of said rim, such slot having its transverse face nearest such rim-end formed at an angle to the radius of said rim; of a plate attached to the other end of said rim and extending beneath such first-named end, when such ends are brought into juxtaposition; a transverse rib on said plate adapted to thereupon engage such slot and having an edge complementary to such acute-angled edge of the latter; and a locking member pivotally mounted upon the first-named end of such rim and adapted to engage with said plate and thereby prevent disengagement of said rib from such slot.

2. The combination with a transversely split tire-supporting rim, having a transversely disposed slot adjacent to, but spaced from, one end of said rim, such slot having its transverse face nearest such rim-end formed at an angle to the radius of said rim; of a plate attached to the other end of said rim and extending beneath such first-named end, when such ends are brought into juxtaposition; a transverse rib on said plate adapted to thereupon engage such slot and having an edge complementary to such acute-angled edge of the latter; and a locking member pivotally mounted upon the first-named end of such rim and adapted to press said plate longitudinally to force together the complementary edges of said rib and slot.

3. The combination with a transversely split tire-supporting rim, having a transversely disposed slot adjacent to, but spaced from, one end of said rim, such slot having its transverse face nearest such rim-end formed at an angle to the radius of said rim; of a plate attached to the other end of said rim and extending beneath such first-named end, when such ends are brought into juxtaposition; a transverse rib on said plate adapted to thereupon engage such slot and having an edge complementary to such acute-angled edge of the latter; and a locking member pivotally mounted upon the first-named end of such rim and adapted to swing under said plate and thereby prevent disengagement of said rib from such slot, said locking member being also adapted to engage the end of said plate to force together the complementary edges of said rib and slot.

Signed by me, this 4th day of March, 1914.

RICHARD S. BRYANT.

Attested by—
  Inez Phelps,
  Jno. F. Oberlin.